United States Patent
Kataoka et al.

(10) Patent No.: US 7,427,641 B2
(45) Date of Patent: Sep. 23, 2008

(54) INK COMPOSITION

(75) Inventors: Shuichi Kataoka, Nagano-Ken (JP); Kazuhide Kubota, Nagano-Ken (JP); Kazuaki Watanabe, Nagano-Ken (JP); Kiyohiko Takemoto, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 333 days.

(21) Appl. No.: 10/494,076

(22) PCT Filed: Dec. 27, 2002

(86) PCT No.: PCT/JP02/13853

§ 371 (c)(1),
(2), (4) Date: Apr. 29, 2004

(87) PCT Pub. No.: WO03/055953

PCT Pub. Date: Jul. 10, 2003

(65) Prior Publication Data

US 2004/0249018 A1 Dec. 9, 2004

(30) Foreign Application Priority Data

Dec. 27, 2001 (JP) ............................. 2001-396126
Dec. 27, 2001 (JP) ............................. 2001-398518
Dec. 27, 2001 (JP) ............................. 2001-398524

(51) Int. Cl.
*C09D 11/00* (2006.01)
(52) U.S. Cl. ...................... 523/160; 523/161
(58) Field of Classification Search ................. 523/160, 523/161
See application file for complete search history.

(56) References Cited

U.S. PATENT DOCUMENTS

| | | | |
|---|---|---|---|
| 4,138,381 A | 2/1979 | Chang et al. | |
| 4,226,754 A | 10/1980 | Yun et al. | |
| 4,384,096 A | 5/1983 | Sonnabend | |
| 4,421,902 A | 12/1983 | Chang et al. | |
| 4,668,410 A | 5/1987 | Haas et al. | |
| RE33,008 E | 8/1989 | Ruffner et al. | |
| 5,705,553 A | 1/1998 | Kuropka | |
| 5,849,815 A * | 12/1998 | Aoki et al. | 523/161 |
| 5,889,083 A * | 3/1999 | Zhu | 523/161 |
| 7,026,392 B2 * | 4/2006 | Nakajima et al. | 524/555 |
| 7,037,956 B2 * | 5/2006 | Liu et al. | 523/122 |
| 2002/0161069 A1 * | 10/2002 | Frenkel et al. | 523/160 |
| 2003/0106462 A1 * | 6/2003 | Yatake et al. | 106/31.59 |
| 2003/0149133 A1 * | 8/2003 | Lau et al. | 523/160 |

FOREIGN PATENT DOCUMENTS

| | | |
|---|---|---|
| EP | 0 013 836 | 8/1980 |
| EP | 594081 A2 | 4/1994 |
| EP | 627450 A1 | 12/1994 |
| EP | 0 705 852 | 4/1996 |
| EP | 778321 A2 | 6/1997 |
| JP | 2-248475 | 10/1990 |
| JP | 4-018467 | 1/1992 |
| JP | 04-370166 | 12/1992 |
| JP | 05059236 A * | 3/1993 |
| JP | 6-136306 A | 5/1994 |
| JP | 7-70254 A | 3/1995 |
| JP | 8-225618 | 9/1996 |
| JP | 8-311383 | 11/1996 |
| JP | 10-502957 | 3/1998 |
| JP | 10-110126 A | 4/1998 |
| JP | 10-120956 A | 5/1998 |
| JP | 11-131001 A | 5/1999 |
| JP | 2000-351925 A | 12/2000 |
| WO | 96/02599 | 2/1996 |
| WO | 98/55553 | 12/1998 |
| WO | WO 01/38102 A1 * | 5/2001 |
| WO | WO 01/96483 A1 * | 12/2001 |
| WO | WO 02/32971 A1 * | 4/2002 |

OTHER PUBLICATIONS

English Abstract of JP 770254 Dated Mar. 14, 1995.
English Abstract of JP 6136306 Dated May 17, 1994.
English Abstract of JP 2000 351925 Dated Dec. 19, 2000.
English Abstract of JP 11 131 001 Dated May 18, 1999.
English Abstract of JP 8 311 383 Dated Nov. 26, 1996.
English Abstract of JP 10 11 0126 Dated Apr. 28, 1998.
English Abstract of JP 10120956 Dated May 12, 1998.
Patent Abstracts of Japan of JP 04-018467 dated Jan. 22, 1992.
Patent Abstracts of Japan of JP 04-370166 dated Dec. 22, 1992.
Patent Abstracts of Japan of JP 2-248475 dated Oct. 4, 1990.

* cited by examiner

*Primary Examiner*—Edward J Cain
(74) *Attorney, Agent, or Firm*—Ladas & Parry LLP

(57) ABSTRACT

There is provided an ink composition which can yield records possessing excellent rubbing/abrasion resistance and scratch resistance. Specifically, records possessing excellent rubbing/abrasion resistance and scratch resistance can be produced by using an ink composition comprising: an alkali-soluble copolymer; water; a colorant; and at least one member selected from the group consisting of wax, a viscosity modifier, and a wetting agent. The alkali-soluble copolymer is a copolymer, with an acid value of not more than 40, which is produced by polymerizing an ethylenically unsaturated carboxylic acid monomer and other monomer copolymerizable with the ethylenically unsaturated carboxylic acid monomer in the presence of an alcoholic hydroxyl-containing water-soluble polymer compound or a copolymerizable surfactant and has been adjusted to a pH value, at which the copolymer is soluble in water, by the addition of an inorganic base.

15 Claims, No Drawings

INK COMPOSITION

BACKGROUND OF THE INVENTION

1. Field of the Invention

The present invention relates to an ink composition and particularly to a water-base pigment ink composition suitable for printing on specialty paper for ink jet recording.

2. Background Art

Ink jet recording is a printing method wherein droplets of an ink are ejected and deposited on recording media, such as paper, to perform printing. An innovative advance of a recent ink jet recording technique has made it possible to realize the production of images having quality comparable substantially favorably with images produced by silver salt photography or images yielded by high-definition printing realized by offset printing. To realize such high-quality images, ink jet recording media having a high level of gloss comparable to photographic paper, art paper and the like used in the field of silver salt photography and offset printing have been developed. Media comprising an ink-receptive layer containing a porous pigment such as silica provided on a substrate such as paper or a film have been mainly used as this type of high-gloss recording media.

The ink used in recording characters or images on the above high-gloss recording media is generally a water-base ink comprising water as a main component and a colorant, a resin emulsion, and other various additives added to the water. Dyes or pigments may be used as the colorant. However, pigments are superior to other colorants in weatherfastness such as lightfastness, gasfastness, waterfastness, and moisturefastness. Therefore, in recent years, the development of pigment inks utilizing properties of pigments has been advanced. Further, water-based pigment inks, which contain a resin emulsion for improving the fixation of the pigment onto the recording medium, have become used.

The use of the recording medium having an ink-receptive layer in combination with the resin emulsion-containing pigment ink composition can realize good rubbing/abrasion resistance and good scratch resistance of the formed images. Specifically, upon printing of the ink composition onto the recording medium, the ink-receptive layer absorbs the solvent component and allows the pigment particles and the fine particles of the polymer in the resin emulsion to stay on the surface of the recording medium. The reason for this is as follows. On the surface of the recording medium, since the amount of the solvent component is reduced, the density of fine particles of the polymer is increased and a film forming reaction by the fine particles of the polymer is allowed to proceed to form a film which allows the pigment to be fixed onto the surface of the recording medium.

Further, ink compositions containing a water-soluble resin have also been proposed. For example, Japanese Patent Laid-Open No. 18467/1992 discloses a water-based ink containing a specific carbon black and a water-soluble resin having an acid value of not less than 100 and a weight average molecular weight of 3,000 to 7,000 in an aqueous medium. The claimed advantage of this water-base ink is that precipitates are less likely to occur even after storage for a long period of time. Further, Japanese Patent Laid-Open No. 70254/1995 describes a water-soluble resin which has been produced by neutralizing, with a basic compound, a copolymer having an high acid value produced by copolymerizing 21 to 99% by weight of an ethylenically unsaturated carboxylic acid monomer with other monomer in the presence of polyvinyl alcohol.

Further, ink compositions, into which various waxes have been incorporated mainly for improving the fixation onto a recording medium and the waterfastness, are also known in the art. For example, Japanese Patent Laid-Open No. 370166/1992 describes a water-based ink composition containing a pigment, polyvinylpyrrolidone, and wax. In this water-based ink composition, after printing onto a recording medium, heat treatment should be carried out at a temperature at or above the melting point or softening point of the wax.

There is a still strong demand for high quality of images yielded by ink jet recording. Further, the development of ink compositions for ink jet recording, which can realize high-quality images, has been desired.

SUMMARY OF THE INVENTION

The present inventor has now found that an ink composition comprising a specific alkali-soluble copolymer and at least one member selected from the group consisting of wax, viscosity modifiers, and wetting agents has good various properties required of ink compositions, for example, ejection stability, storage stability, weathering resistance, and color development and, at the same time, can realize formation, on recording media, especially specialty paper, of images possessing excellent rubbing/abrasion resistance and scratch resistance. The present invention has been made based on such finding.

Accordingly, an object of the present invention is to provide an ink composition which has good various properties required of ink compositions, for example, ejection stability, storage stability, weathering resistance, and color development and can realize the formation, on recording media, especially specialty paper, images possessing excellent rubbing/abrasion resistance and scratch resistance.

According to one aspect of the present invention, there is provided an ink composition comprising: an alkali-soluble copolymer; water; a colorant; and at least one member selected from the group consisting of wax, a viscosity modifier, and a wetting agent, said alkali-soluble copolymer being a copolymer, with an acid value of not more than 40, which is produced by polymerizing an ethylenically unsaturated carboxylic acid monomer and other monomer copolymerizable with the ethylenically unsaturated carboxylic acid monomer in the presence of an alcoholic hydroxyl-containing water-soluble polymer compound or a copolymerizable surfactant and has been adjusted to a pH value, at which the copolymer is soluble in water, by the addition of an inorganic base.

DETAILED DESCRIPTION OF THE INVENTION

Alkali-Soluble Copolymer

The ink composition according to the present invention contains an alkali-soluble copolymer. The copolymer has an acid value of not more than 40 and is produced by polymerizing an ethylenically unsaturated carboxylic acid monomer and other monomer copolymerizable with the ethylenically unsaturated carboxylic acid monomer in the presence of an alcoholic hydroxyl-containing water-soluble polymer compound or a copolymerizable surfactant and has been adjusted to a pH value, at which the copolymer is soluble in water, by the addition of an inorganic base.

In the present invention, the acid value of the alkali-soluble copolymer is not more than 40, preferably in the presence of 10 to 40, more preferably in the range of 30 to 40. When the acid value is in the above-defined range, images possessing good quality as well as excellent rubbing/abrasion resistance and scratch resistance can be realized. Especially, the above effect can be realized on a high level in specialty paper for ink jet recording which will be described later.

In the present invention, the weight average molecular weight of the alkali-soluble copolymer is not particularly limited. However, the weight average molecular weight is preferably not less than 8,000, more preferably 9,000 to 100,000, still more preferably 10,000 to 50,000. When the molecular weight is in the above-defined molecular weight range, the resin is easy to handle and, in addition, the above effect can be attained on a high level. A molecular weight of not less than 8,000 is particularly preferred from the viewpoint of rubbing/abrasion resistance.

In the present invention, the glass transition temperature of the alkali-soluble copolymer is not particularly limited. However, the glass transition temperature is preferably 5 to 50° C., more preferably 20 to 40° C. When the glass transition temperature is in the above-defined temperature range, images possessing excellent bending resistance and blocking resistance can be obtained. In the present invention, even when the glass transition temperature of the alkali-soluble copolymer is somewhat raised, the film forming temperature of the ink composition according to the present invention is generally kept low.

In the present invention, the alkali-soluble copolymer may be added, to the ink composition, in the form of a water-soluble resin, in the form of a resin emulsion, or in the form of fine particles of the polymer.

In the ink composition according to the present invention, the alkali-soluble copolymer is usually added in the form of an aqueous solution to the ink composition. In this case, the solid content of the aqueous solution is generally 1 to 40% by weight, preferably 20 to 30% by weight. This aqueous solution may contain a water-soluble organic solvent for an ink composition which will be described later. The solid content of the alkali-soluble copolymer, even when used in the form of a resin emulsion or fine particles of the polymer, is generally 1 to 40% by weight, preferably 20 to 30% by weight. The resin emulsion may be used in the form of an aqueous emulsion.

In the present invention, the pH value of the alkali-soluble copolymer in the form of the aqueous solution is preferably 8 to 11, more preferably 9 to 11. When the pH value is in the above-defined range, an ink composition particularly having excellent ejection stability and dispersion stability can be realized.

Further, preferably, the pH value of the ink composition according to the present invention is also substantially equal to that of the aqueous solution of the alkali-soluble copolymer.

In the ink composition according to the present invention, the amount of the alkali-soluble copolymer added is preferably about 0.01 to 1% by weight, more preferably about 0.1 to 0.5% by weight, in terms of solid content based on the total weight of the ink composition.

Further, in a relationship with the colorant, the alkali-soluble copolymer is preferably added in an amount of 2 to 200 parts by weight, more preferably 5 to 150 parts by weight, particularly preferably 10 to 100 parts by weight, based on 100 parts by weight of the colorant.

The ethylenically unsaturated carboxylic acid monomer constituting the alkali-soluble copolymer is not particularly limited, and examples thereof include: ethylenically unsaturated monocarboxylic monomers such as acrylic acid and methacrylic acid; ethylenically unsaturated polyhydric carboxylic acid monomers such as itaconic acid, maleic acid, fumaric acid, and butene tricarboxylic acid; partially esterified monomers of ethylenically unsaturated polyhydric carboxylic acids such as monobutyl fumarate, monobutyl maleate, and mono-2-hydroxypropyl maleate; polycarboxylic acid anhydrides such as maleic anhydride and citraconic anhydride; and the like. These monomers may be used alone or in a combination of two or more. Among them, ethylenically unsaturated monocarboxylic acids such as (meth) acrylic acid are preferred, and methacrylic acid is more preferred.

The other monomer, copolymerizable with the ethylenically unsaturated carboxylic acid monomer, constituting the alkali-soluble copolymer is not particularly limited, and examples thereof include: aromatic vinyl monomers such as styrene, α-methylstyrene, vinyltoluene, and chlorostyrene; ethylenically unsaturated carboxylic ester monomers such as methyl (meth)acrylate, ethyl (meth)acrylate, propyl (meth)acrylate, butyl (meth)acrylate, isobutyl (meth)acrylate, n-amyl (meth)acrylate, isoamyl (meth)acrylate, n-hexyl (meth)acrylate, 2-ethylhexyl (meth)acrylate, n-octyl (meth) acrylate, 2-hydroxyethyl (meth)acrylate, hydroxypropyl (meth)acrylate, and glycidyl (meth)acrylate; ethylenically unsaturated nitrile monomers such as (meth)acrylonitrile; ethylenically unsaturated glycidyl ether monomers such as allylglycidyl ether; ethylenically unsaturated amide monomers such as (meth)acrylamide, N-methylol (meth)acrylamide, and N-butoxymethyl (meth)acrylamide; conjugated diene monomers such as 1,3-butadiene, isoprene, 2,3-dimethyl-1,3-butadiene, and 1,3-pentadiene; and vinyl carboxylate such as vinyl acetate. These monomers may be used alone or in a combination of two or more. Among them, ethylenically unsaturated carboxylic ester monomers are preferred, and methyl methacrylate and ethyl acrylate are more preferred, from the viewpoint of excellent lighffastness and gloss of the formed images.

The ratio of the ethylenically unsaturated carboxylic acid monomer to the other monomer may be properly determined. Since, however, the amount of the ethylenically unsaturated carboxylic acid monomer contributes greatly to the determination of the acid value of the alkali-soluble copolymer, the ratio may be determined so as to realize an acid value of not more than 40.

The alkali-soluble copolymer may be produced by polymerizing the above monomer mixture in the presence of an alcoholic hydroxyl-containing water-soluble polymer compound or a copolymerizable surfactant.

When the alcoholic hydroxyl-containing water-soluble polymer compound is used in the production of the alkali-soluble copolymer, this compound, together with the monomer mixture, is preferably polymerized in a water medium. The whole quantity of the alcoholic hydroxyl-containing water-soluble polymer compound and the monomer mixture may be added at a time to the reactor before the start of the polymerization. Alternatively, a method may be adopted wherein a part of them is charged into the reactor before the start of the polymerization and, after the start of the polymerization, the remaining part is added by portions or is added continuously. In the addition by portions or continuous addition, the addition rate may be constant or may be varied depending upon the degree of progress of the polymerization.

The alcoholic hydroxyl-containing water-soluble polymer compound and the monomer mixture may be added separately from each other, or alternatively may be added in the form of a dispersion prepared by mixing them with water. When the alcoholic hydroxyl-containing water-soluble polymer compound and the monomer are added separately from each other, preferably, the addition of them is started substantially simultaneously. When only the monomer mixture is added in a large amount before the addition of the alcoholic hydroxyl-containing water-soluble polymer compound, an agglomerate is likely to form. Conversely, when only the alcoholic hydroxyl-containing water-soluble polymer compound is added in a large amount before the addition of the monomer compound, the polymerization system is often likely to cause increased viscosity or likely to form an agglomerate. In order to avoid this unfavorable phenomenon, the addition of the alcoholic hydroxyl-containing water-soluble polymer compound is preferably completed substantially simultaneously with the completion of the addition of the monomer mixture, although the addition of the alcoholic hydroxyl-containing water-soluble polymer compound and the addition of the monomer mixture are not necessarily completed simultaneously.

In a preferred embodiment of the present invention, the method, in which a dispersion prepared by mixing the alcoholic hydroxyl-containing water-soluble polymer compound with the monomer mixture and water together is added to the reactor after the start of the polymerization, is preferred from the viewpoint of uniform chain distribution of the ethylenically unsaturated acid monomer in a polymer chain of the alkali-soluble copolymer.

In the present invention, the alcoholic hydroxyl-containing water-soluble polymer compound refers to a water-soluble polymer compound which preferably contains 5 to 25 alcoholic hydroxyl groups per the molecular weight of 1000. Specific examples of such polymer compounds include: vinyl alcohol polymers such as polyvinyl alcohol and various modification products thereof; saponification products of a copolymer of vinyl acetate with acrylic acid, methacrylic acid, or maleic anhydride; cellulose derivatives such as alkylcellulose, hydroxyalkylcellulose, and alkylhydroxyalkylcellulose; starch derivatives such as alkyl starch, carboxylmethyl starch, and starch oxide; gum Arabic and tragacanth; and polyalkylene glycol. The utilization of vinyl alcohol polymers is particularly preferred because products having stable quality are commercially available.

The weight average molecular weight of the alcoholic hydroxyl-containing water-soluble polymer compound is not particularly limited. However, the molecular weight is generally 1,000 to 500,000. Preferably, the lower limit of the molecular weight is 2,000, and the upper limit of the molecular weight is 300,000. When the molecular weight of the alcoholic hydroxyl-containing water-soluble polymer compound is in the above-defined range, good dispersion stabilization effect can be attained and, further, the viscosity during the polymerization can be maintained in a proper range suitable for the polymerization.

The amount of the alcoholic hydroxyl-containing water-soluble polymer compound is generally about 0.05 to 20 parts by weight based on 100 parts by weight of the monomer. For the alcoholic hydroxyl-containing water-soluble polymer compound, preferably, the lower limit of the amount is 1% by weight, and the upper limit of the amount is 10 parts by weight. When the amount of the alcoholic hydroxyl-containing water-soluble polymer compound is in the above-defined range, good dispersion stabilization effect can be attained. As a result, the occurrence of the agglomerate can be effectively suppressed, and the viscosity during the polymerization can be maintained in a proper range suitable for the polymerization.

In the production of the alcoholic hydroxyl-containing water-soluble polymer compound, the surfactant commonly used in the emulsion polymerization may not be used. When the alcoholic hydroxyl-containing water-soluble polymer compound is used in combination with the surfactant, however, the amount of the surfactant added is preferably less than 0.05 part by weight based on 100 parts by weight of the whole monomer used in the synthesis of the alkali-soluble copolymer. The use of an excessive amount of the surfactant should be preferably avoided because the waterfastness of images is sometimes deteriorated.

The alkali-soluble copolymer may be prepared by polymerizing (preferably emulsion-polymerizing) an ethylenically unsaturated carboxylic acid monomer with other monomer copolymerizable with the ethylenically unsaturated carboxylic acid monomer in the presence of a copolymerizable surfactant.

In the present invention, the copolymerizable surfactant is a surfactant containing one or more polymerizable vinyl groups per molecule. Specific examples of surfactants usable herein include: anionic polymerizable surfactants, such as sodium propenyl-2-ethylhexylsulfosuccinate, (meth)acrylic acid polyoxyethylenesulfate, ammonium polyoxyethylene alkylpropenyl ethersulfate, and (meth)acrylic acid polyoxyethylene ester phosphate; and nonionic polymerizable surfactants such as polyoxyethylene alkylbenzene ether (meth)acrylate, and polyoxyethylene alkyl ether (meth)acrylate. Among these copolymerizable surfactants, ammonium polyoxyethylene alkylpropenyl ethersulfate is suitable from the viewpoint of excellent balance between monomer emulsion dispersing properties and copolymerizability with the monomer.

The amount of the copolymerizable surfactant is generally 0.01 to 5.0 parts by weight, preferably 0.05 to 5.0 parts by weight, more preferably 0.1 to 3.0 parts by weight, based on 100 parts by weight of the whole monomer used in the synthesis of the alkali-soluble copolymer. When the amount of the copolymerizable surfactant is in the above-defined range, during the polymerization, the occurrence of a large quantity of coagulates and foaming can be effectively prevented and, consequently, the alkali-soluble copolymer can be successfully produced.

In the production of the alkali-soluble copolymer using the copolymerizable surfactant, it is preferable not to use a nonpolymerizable surfactant. When the nonpolymerizable surfactant is used in combination with the copolymerizable surfactant, however, the amount of the nonpolymerizable surfactant used is generally less than 0.05 part by weight based on 100 parts by weight of the whole monomer used in the synthesis of the alkali-soluble copolymer. The use of an excessive amount of the surfactant often deteriorates the waterfastness of images and thus should be preferably avoided.

In the polymerization reaction, any polymerization initiator may be used without particular limitation. Specific examples thereof include: inorganic peroxides such as sodium perfulfate, potassium persulfate, ammonium persulfate, potassium perphosphate, and hydrogen peroxide; organic peroxides, such as diisopropylbenzene hydroperoxide, cumene hydroperoxide, t-butyl hydroperoxide, 1,1,3,3-tetramethylbutyl hydroperoxide, di-t-butylperoxide, isobutyryl peroxide, and benzoyl peroxide; and azo compounds, such as azobisisobutyronitrile, azobis-2,4-dimethylvaleronitrile, and methyl azobisisobutyrate. These polymerization initiators may be used alone or in a combination of two or more. Among others, persulfates such as potassium persulfate and ammonium persulfate are preferred.

The amount of the polymerization initiator used varies depending upon the type of the polymerization initiator. Preferably, however, the amount of the polymerization initiator is 0.5 to 5 parts by weight, more preferably 0.8 to 4 parts by weight, based on 100 parts by weight of the whole monomer mixture used in the production of a water dispersion of the alkali-soluble copolymer.

These polymerization initiators may also be used, as a redox polymerization initiator, in a combination with a reducing agent. The reducing agent for the redox polymerization initiator is not particularly limited, and specific examples thereof include: compounds containing metallic ions in a reduced state such as ferrous sulfate and cuprous naphthalate; sulfonic acid compounds such as sodium methanesulfonate; amine compounds such as dimethylaniline; and the like. These reducing agents may be used alone or in a combination of two or more. The amount of the reducing agent used varies depending upon the type of the reducing agent. Preferably, however, the amount of the reducing agent is 0.03 to 10 parts by weight based on one part by weight of the polymerization initiator.

In a preferred embodiment of the present invention, if necessary, a chain transfer agent may be used during the polymerization for regulating the weight average molecular weight of the alkali-soluble copolymer. Chain transfer agents include: mercaptans, such as t-dodecylmercaptan and n-dodecylmercaptan; α-methyl styrene dimer; sulfides, such as dimethyl xanthogenic disulfide and diisopropyl xanthogenic disulfide; nitrile compounds, such as 2-methyl-3-butynenitrile and 3-pentenenitrile; thioglycolates, such as methyl thioglycolate, propyl thioglycolate, and octyl thioglycolate; β-mercaptopropionates, such as methyl β-mercaptopropionate and octyl β-mercaptopropionate; and the like. They may be used alone or in a combination of two or more. Among these chain transfer agents, thioglycolates are preferred, and octyl thioglycolate is more preferred.

When the chain transfer agent is used, the addition amount thereof is generally 0.1 to 5 parts by weight, preferably 0.5 to 4 parts by weight, based on 100 parts by weight of the monomer used in the production of the alkali-soluble copolymer from the viewpoint of the viscosity after the neutralization and the regulation of the molecular weight. The method for adding the chain transfer agent is not particularly limited. The whole amount of the chain transfer agent may be added at a time, or alternatively may be added consecutively by portions or continuously to the polymerization system.

The polymerization temperature in the production of the alkali-soluble copolymer is generally 0 to 100° C., preferably 30 to 90° C. The polymerization conversion is generally not less than 90% by weight, preferably not less than 95% by weight.

In the present invention, the degree of neutralization (molar equivalent of inorganic base based on molar equivalent of ethylenically unsaturated carboxylic acid monomer) in the neutralization product of the alkali-soluble copolymer is not particularly limited. In general, however, the degree of neutralization is not less than 70%, preferably not less than 95%.

Inorganic bases usable for neutralizing the alkali-soluble copolymer are not particularly limited. However, examples thereof include: alkali metal hydroxides such as sodium hydroxide and potassium hydroxide; and alkaline earth metal hydroxides such as calcium hydroxide and magnesium hydroxide. They may be used alone or in a combination of two or more. Among these inorganic bases, sodium hydroxide is suitable. Ammonia is also usable as the inorganic base. However, the above metal bases are preferred from the viewpoint of temporal stability (for example, a lowering in pH) and ejection stability of the ink.

In the present invention, among the above alkali-soluble copolymers, those prepared by polymerization in the presence of the alcoholic hydroxyl-containing water-soluble polymer compound are preferred because the pH-adjusted resin composition, when stored for a long period of time, is less likely to undergo a change in viscosity and has superior halftone dot reproduction.

In another preferred embodiment of the present invention, the weight ratio of the alkali-soluble copolymer to at least one member selected from the group consisting of waxes, viscosity modifiers, and wetting agents, which will be described later, is preferably in the range of 0.5 to 3:1. The lower limit of the weight ratio is more preferably 0.6, and the upper limit of the weight ratio is more preferably 2.

Wax

The ink composition according to the present invention may contain wax. This wax may be soluble or hardly soluble in water. Water-soluble waxes include waxes containing hydrophilic groups such as hydroxyl, carboxyl, ethylene oxide, or amine groups, and hardly-soluble waxes are preferably used mainly as a wax emulsion. Specific examples of waxes include plant and animal waxes such as carnauba wax, candelilla wax, beeswax, rice wax, and lanoline, petroleum waxes such as paraffin wax, microcrystalline wax, polyethylene wax, polyethylene oxide wax, and petrolactam, mineral waxes such as montan wax and ozokerite, synthetic waxes such as carbon wax, Hoechst wax, polyethylene wax, and stearamide, emulsions of waxes of natural or synthetic waxes such as α-olefin-maleic anhydride copolymers, and mixed waxes. They may be used alone or as a mixture of two or more. Preferred waxes include polyalkylene waxes, particularly polyethylene waxes. Polyalkylene wax emulsions are more preferred, and polyethylene wax emulsion is particularly preferred. Other latexes, colloid solutions, suspensions and the like are also usable.

Commercially available waxes are also usable, and specific examples thereof include AQUACER 498 (paraffin wax, m.p. 58° C., solid content 50%, manufactured by Bik-Chemie Japan K.K.), AQUACER 535 (mixed wax, m.p. 95° C., solid content 30%, manufactured by Bik-Chemie Japan K.K.), and CERAFLOUR 990 (polyethyrene wax, m.p. 105° C., manufactured by Bik-Chemie Japan K.K.).

In the ink composition according to the present invention, the content of the wax is preferably about 0.01 to 1% by weight, more preferably about 0.1 to 0.5% by weight, based on the total weight of the ink composition.

In an embodiment of the present invention, the wax may contain a resin emulsion. When the alkali-soluble copolymer is added in the form of a resin emulsion, an emulsion of another type of resin component is added.

In a preferred embodiment of the present invention, this resin emulsion is preferably a polyalkylene emulsion, more preferably a polyethylene emulsion or a polypropylene emulsion.

In another preferred embodiment of the present invention, the polyalkylene emulsion is preferably one modified with maleic acid or maleic anhydride.

In the present invention, the polyalkylene resin may be utilized in the form of an emulsion by the conventional method.

In the ink composition according to the present invention, the content of the resin emulsion is preferably about 0.05 to 2% by weight, more preferably about 0.2 to 1% by weight, based on the total weight of the ink composition.

In the present invention, examples of preferred polyalkylene emulsions include emulsions of high density polyethylene, medium density polyethylene, low density polyethylene, polypropylene, polybutene, poly-4-methylpentene-1, ethylene-α-olefin copolymer, ethylene-propylene rubber, ethylene-propylene-diene terpolymer (EPDM), ethylene-vinyl acetate copolymer, butyl rubber, butadiene rubber, low-crystallinity ethylene-propylene copolymer, propylene-butene copolymer, and ethylene-vinyl ester copolymer. These emulsions may also be used in a combination of two or more.

The average molecular weight of the resin component in the polyalkylene emulsion is generally 1,000 to 50,000, preferably 2,000 to 20,000.

These polyalkylene resins may be prepared by degrading a high-molecular weight polyalkylene containing the same constituent units by heat decomposition, or by conventional telomerization (homo- or copolymerization of an α-olefin). The polyalkylene resin prepared by degrading the high-molecular weight polyolefin by heat decomposition is preferred from the viewpoint of a high terminal double bond content. The double bond content of the polyalkylene resin is not particularly limited. Preferably, however, the content is not less than 0.5 per 1000 carbon atoms.

In a preferred embodiment of the present invention, unsaturated carboxylic acids or anhydride thereof for modification include: acrylic acid, methacrylic acid, crotonic acid, maleic acid, cinnamic acid, itaconic acid, citraconic acid, fumaric acid and the like; and unsaturated carboxylic acid anhydrides such as maleic anhydride, itaconic anhydride, and citraconic anhydride. Among them, maleic acid and maleic anhydride are particularly preferred.

The modification of the polyalkylene with the unsaturated carboxylic acid or an anhydride thereof may be carried out by a conventional modification method, for example, by a method utilizing a heating reaction or an organic peroxide. The polyalkylene is heat melted generally at 120 to 220° C. or dissolved, for example, in an inert gas atmosphere, in the presence or absence of a solvent such as an aromatic and/or chlorine solvent and in the presence or absence of a radical generation catalyst (such as peroxides, for example, di-tert-butyl peroxide, tert-butyl hydroperoxide, dicumyl peroxide, benzoyl peroxide, tert-butylperoxide benzoate; and azonitriles, for example, azobisisobutyronitrile, azobisisovaleronitrile, and azobisisopropionitrile) to react (graft) the unsaturated carboxylic acid or an anhydride thereof with the polyalkylene. The proportion of the weight of the unsaturated carboxylic acid (anhydride) units may be properly determined. The proportion, however, is preferably about 0.5 to 20% by weight, more preferably 1 to 15% by weight.

Viscosity Modifier

The ink composition according to the present invention may contain a viscosity modifier, and specific examples of preferred viscosity modifiers include various synthetic polymer-type thickening agents (that is, synthetic polymer-type viscosity modifiers). A specific example of a preferred synthetic polymer-type viscosity modifier is a polymer prepared by a polymerization reaction of (a) methacrylic acid, (b) a methacrylic ester, and (c) a saturated aliphatic carboxylic acid vinyl ester. For example, Japanese Patent Laid-Open No. 23180/1980 (U.S. Pat. No. 4,226,754) describes a polymer comprising:

(a) 15 to 40% by weight (preferably 20 to 35% by weight) of methacrylic acid, (b) 5 to 70% by weight (preferably 10 to 50% by weight) of at least one methacrylic ester represented by general formula (I)

$$CH_2C(CH_3)C(O)OR \qquad (I)$$

wherein R represents an optionally (preferably hydroxy) substituted saturated or unsaturated hydrocarbon group having 1 to 20 carbon atoms (preferably 1 to 12 carbon atoms) (preferably alkyl group), and (c) 5 to 80% by weight (preferably 20 to 60% by weight) of a polymer comprised of at least one saturated aliphatic carboxylic acid having 2 to 11 carbon atoms (preferably 2 to 7 carbon atoms) and a vinyl compound. This polymer is preferably used in the present invention.

Examples of the methacrylic esters (b) include methyl methacrylate, ethyl methacrylate, propyl methacrylate, isopropyl methacrylate, butyl methacrylate, n-amyl methacrylate, sec-amyl methacrylate, hexyl methacrylate, lauryl methacrylate, stearyl methacrylate, ethylhexyl methacrylate, crotyl methacrylate, cinnamyl methacrylate, oleyl methacrylate, ricinoleyl methacrylate, hydroxyethyle methacrylate, or hydroxypropyl methacrylate. Among them, methyl methacrylate is preferred.

Aliphatic carboxylic acid vinyl esters include, for example, vinyl acetate, vinyl propionate, vinyl butylate, tert-vinyl butylate, vinyl caprylate, vinyl stearate, vinyl laurate, or vinyl oleate. Among them, vinyl acetate is preferred.

The polymer viscosity modifier contains a satisfactory amount of carboxylic acid groups, and the polymer is rendered soluble in water and is neutralized with a water-soluble base. For this reason, the polymer viscosity modifier is often called an alkali-swellable or alkali-soluble latex copolymerizable thickening agent. The viscosity modifier is commercially available, for example, under the tradename RHEOLATE 350 from Rheox International Inc. (U.S.A.).

A polymer viscosity modifier prepared by introducing a hydrophobic group into the polymer main chain of the alkali-swellable or alkali-soluble polymer viscosity modifier is also known. For example, U.S. Pat. No. 4,384,096 describes a polymer reaction product of an α,β-ethylenically unsaturated carboxylic acid monomer having 3 to 8 carbon atoms, a nonionic vinyl monomer, and 1 to 30% of a certain specific vinyl ester surfactant [for example, an alkylphenoxypoly(ethyleneoxy)ethyl acrylate terminated on one end with a $C_8$ to $C_{16}$ alkyl phenyl group]. U.S. Pat. No. 4,138,381 describes a reaction product of an unsaturated carboxylic acid having 3 to 6 carbon atoms, an alkyl acrylate or an alkyl methacrylate, and an ester containing an alkylphenyl group (in which the alkyl group has 8 to 20 carbon atoms). These polymer viscosity modifiers are also suitable for use in the ink composition according to the present invention.

Further, an acryl emulsion copolymer viscosity modifier prepared by emulsion-polymerizing acrylic acid or methacrylic acid, an alkyl acrylate or an alkyl methacrylate, a hydrophobic group-containing ethoxylated ester of acrylic acid or methacrylic acid, and a polyethylenically unsaturated monomer (see, for example, Europe Patent No. 13,836) is also suitable for use in the ink composition according to the present invention. Furthermore, a product prepared by adding an alkyl polyethyleneoxy ether surfactant to an associative polymer having a polyacrylamide main chain through salvation (see "Proceedings of the ACS Division of Polymeric Materials," Vol. 57, pp. 476-481 (1987)) is also suitable for use in the ink composition according to the present invention.

A copolymer, which is a reaction product of various monomers including methacrylic acid, ethyl acrylate, a copolymerizable ethylenically unsaturated monomer, and a minor amount of a polyethylenically unsaturated monomer, is also suitable for use in the ink composition according to the present invention (see, for example, U.S. Pat. No. 4,421,902).

Further, in recent years, it is known that a mineral oil-free water-soluble copolymer is used to modify the viscosity of the system (see, for example, U.S. Pat. No. 4,668,410). The polymer described in the above-described U.S. Pat. No. 4,668,410 is a reaction product of six components. The components are methacrylic acid, a methacrylic or acrylic ester of an alcohol, a vinyl ester, and a surface active unsaturated ester. This polymer, upon partial or complete neutralization, can be rendered soluble in water or can be dispersed in a colloidal form in water for use as a thickening agent (a thickener). A similar copolymer prepared by condensing a polyhydric alcohol with a monoethylenically unsaturated monoisocyanate is also known (see, for example, U.S. reissue Patent No. 33,008) and is commercially available, for example, from Rheox International Inc. (U.S.A.) under the tradenames RHEOLATE 210 and RHEOLATE 216.

Furthermore, a viscosity modifier for an aqueous composition (see Japanese Patent Laid-Open No. 225618/1996) prepared by reacting at least one of $\alpha,\beta$-ethylenically unsaturated carboxylic acid monomers having 3 to 8 carbon atoms (for example, acrylic acid or methacrylic acid) (about 15 to 80% by weight), at least one of copolymerizable vinyl nonionic ethylenically unsaturated monomers (for example, ethyl acrylate, vinyl acetate, or methyl methacrylate) (about 15 to 85% by weight), and a hydrophobic phenol monomer, that is, a nonionic poly(alkyleneoxy)vinyl monomer terminated with an aralkyl-substituted phenolic hydrophobic group (about 0.5 to 25% by weight) is also suitable for use in the ink composition according to the present invention.

In the ink composition according to the present invention, one of or a combination of two or more of the above viscosity modifiers may be used.

The content of the viscosity modifier is preferably about 0.01 to 1% by weight, more preferably about 0.05 to 0.5% by weight, based on the total weight of the ink composition.

Wetting Agent

The ink composition according to the present invention may contain a wetting agent. Specific examples of preferred wetting agents include polyhydric alcohols, saccharides, or tertiary amines. More preferred are polyhydric alcohols, or mixtures of polyhydric alcohols with saccharides.

These wetting agents can impart water retention and wetting properties to the ink composition, and, as a result, the storage of the ink composition for a long period of time neither causes coagulation of pigment nor an increase in the viscosity of the ink composition. That is, excellent storage stability can be realized. Further, an ink composition can be realized which, even when allowed to stand in an open state, that is, when allowed to stand in contact with air at room temperature, can maintain the fluidity and the redispersibility for a long period of time. In addition, the ink composition does not cause clogging of nozzles during printing or at the time of restarting after interruption of printing, thus offering high ejection stability and storage stability.

Polyhydric alcohols include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, glycerin, dipropylene glycol, tetraethylene glycol, and triethylene glycol. Glycerin is preferred. In the present invention, among the above polyhydric alcohols, those having a boiling point of 200° C. or above are more preferred.

Specific examples of saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, and trehalose. Specific examples of polysaccharides include maltotriose, isomaltotriose, panose, maltotetraose, and maltopentaose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol, sorbit, and panitol. Further, commercially available products such as HS-300 and HS-500 (manufactured by HAYASHIBARA SHOJI, INC Group Corporation) are also usable.

The amount of the saccharide added is preferably about 0.1 to 40% by weight, more preferably about 1 to 30% by weight, based on the total amount of the ink composition.

Specific examples of tertiary amines include trimethylamine, triethylamine, triethanolamine, dimethylethanolamine, diethylethanolamine, triisopropenolamine, butyldiethanolamine, 1-methyl-2-pyrrolidone, 1,3-dimethyl-2-imidazolidinone, and 2-pyrrolidone. They may be used alone or as a mixture of two or more.

The amount of the tertiary amine added to the ink composition is preferably about 0.1 to 10% by weight, more preferably 0.5 to 5% by weight, based on the total amount of the ink composition.

As described above, the ink according to the present invention comprises at least one member selected from the group consisting of waxes, viscosity modifiers, and wetting agents. Two or more types may be selected from these three types and added in combination to the ink.

Colorant

In the present invention, the colorant is not particularly limited. For example, however, water-soluble dyes or water-insoluble pigments may be used. The utilization of water-insoluble pigments is preferred from the viewpoint of excellent density and lighffastness and waterfastness of images.

Pigments usable in the present invention include inorganic pigments and organic pigments. Inorganic pigments usable herein include, in addition to titanium oxide and iron oxide, carbon blacks produced by conventional processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline black.

Carbon blacks usable particularly for black inks include, but are not limited to: carbon blacks manufactured by Mitsubishi Chemical Corporation, for example, No. 2300, No. 900, HCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4 A, and Special Black 4.

Pigments usable for yellow inks include C.I. Pigment Yellow 1, C.I. Pigment Yellow 2, C.I. Pigment Yellow 3, C.I. Pigment Yellow 12, C.I. Pigment Yellow 13, C. I. Pigment Yellow 14 C, C. I. Pigment Yellow 16, C. I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, and C.I. Pigment Yellow 154.

Pigments usable for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 123, C.I. Pigment Red 168, C.I. Pigment Red 184, C.I. Pigment Red 202, and C.I. Pigment Violet 19.

Pigments usable for cyan inks include, but are not limited to, C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4, and C.I. Vat Blue 60.

In the present invention, the particle diameter of the pigment is not particularly limited. Preferably, however, the particle diameter of the pigment is not more than about 10 μm, more preferably not more than 1 μm, still more preferably not more than 0.1 μm.

In the present invention, these pigments are preferably added, to the ink, as a pigment dispersion prepared by dispersing the pigments in an aqueous medium with the aid of a dispersant. In the present invention, the dispersant is not particularly limited. However, dispersants commonly used in the preparation of pigment dispersions, for example, polymeric dispersants and surfactants are usable. Surfactants usable herein include various anionic surfactants, nonionic surfactants, cationic surfactants, and amphoteric surfactants which will be described later.

Examples of preferred polymeric dispersants include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxycellulose.

Examples of additional preferred polymeric dispersants include synthetic polymers, and examples thereof include: polyvinyl alcohols; polyvinyl pyrrolidones; acrylic resins, such as polyacrylic acid, acrylic acid-acrylonitrile copolymer, potassium acrylate-acrylonitrile copolymer, vinyl acetate-acrylic ester copolymer, and acrylic acid-acrylic ester copolymer; styrene-acryl resins, such as styrene-acrylic acid copolymer, styrene-methacrylic acid copolymer, styrene-methacrylic acid-acrylic ester copolymer, styrene-α-methylstyrene-acrylic acid copolymer, and styrene-α-methylstyrene-acrylic acid-acrylic ester copolymer; styrene-maleic acid copolymer; styrene-maleic anhydride copolymer; vinylnaphthalene-acrylic acid copolymer; vinyinaphthalene-maleic acid copolymer; vinyl acetate copolymers, such as vinyl acetate-ethylene copolymer, vinyl acetate-fatty acid vinylethylene copolymer, vinyl acetate-maleic ester copolymer, vinyl acetate-crotonic acid copolymer, and vinyl acetate-acrylic acid copolymer; and salts of the above polymers.

Among them, a copolymer of a monomer having a hydrophobic group with a monomer having a hydrophilic group and a polymer of a monomer having both a hydrophobic group and a hydrophilic group in its molecular structure are particularly preferred.

In a preferred embodiment of the present invention, a pigment having an oxidized surface is used. In this embodiment, the above dispersant may not be used. The oxidation treatment may be carried out by a conventional method. Hydrophilic groups such as carbonyl, carboxyl, hydroxyl, or sulfone groups can be introduced into the surface of the pigment by oxidation treatment. The above-described pigments including carbon black may be used as the pigment.

Water and Other Solvents

The ink composition according to the present invention contains water as a solvent and further may contain a water-soluble organic solvent.

Examples of water-soluble organic solvents include methanol, ethanol, n-propyl alcohol, iso-propyl alcohol, n-butanol, sec-butanol, tert-butanol, iso-butanol, n-pentanol, ethylene glycol, propylene glycol, diethylene glycol, pentamethylene glycol, trimethylene glycol, 2-butyne-1,4-diol, 2-ethyl-1,3-hexanediol, 2-methyl-2,4-pentanediol, N-methyl-2-pyrrolidone, 1,3-dimethyl-2-imidazolidinone, 2-pyrrolidone, glycerin, tripropylene glycol monomethyl ether, dipropylene glycol monoethyl glycol, dipropylene glycol monomethyl ether, dipropylene glycol, triethylene glycol monomethyl ether, tetraethylene glycol, triethylene glycol, diethylene glycol monobutyl ether, diethylene glycol monoethyl ether, and diethylene glycol monomethyl ether.

In the ink composition according to the present invention, the content of the water-soluble organic solvent may be properly determined. Preferably, however, the content of the water-soluble organic solvent is about 10 to 40% by weight, more preferably 10 to 20% by weight, based on the total weight of the ink composition.

In a preferred embodiment of the present invention, the ink composition may contain a penetrating agent. Penetrating agents usable herein include acetylene glycol surfactants, acetylene alcohol surfactants, glycol ethers, 1,2-alkanediols, and polysiloxane surfactants.

Acetylene glycol surfactants include, for example, 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. The acetylene glycol surfactant may be a commercially available product, and examples thereof include OLFINE E 1010, OLFINE STG, and OLFINE Y (tradenames: manufactured by Nissin Chemical Industry Co., Ltd.), Surfynol 61, Surfynol 104, Surfynol 82, Surfynol 465, Surfynol 485, and Surfynol TG (tradenames: manufactured by Air Products and Chemicals Inc.).

The content of the acetylene alcohol surfactant is preferably 0.05 to 5% by weight, more preferably 0.1 to 2% by weight, based on the total amount of the ink composition.

Glycol ethers include lower alkyl ethers of polyhydric alcohols, for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. In particular, the use of triethylene glycol monobutyl ether can realize good record quality.

The content of the glycol ether is preferably 0.5 to 20% by weight, more preferably 1 to 10% by weight, based on the total weight of the ink composition.

The 1,2-alkanediol is preferably a 1,2-$C_{1-8}$ alkyldiol, more preferably 1,2-$C_{1-6}$ alkyldiol, most preferably 1,2-hexanediol. The content of the 1,2-alkyldiol is preferably 1 to 15% by weight, more preferably 2 to 10% by weight, based on the total weight of the ink composition.

Commercially available polysiloxane surfactants are also usable, and examples thereof include BYK-347, BYK-348 (manufactured by Bik-Chemie Japan K.K.).

The ink composition according to the present invention may contain a polyhydric alcohol, a saccharide, a tertiary amine, or an alginic acid derivative. The polyhydric alcohol, the saccharide, and the tertiary amine may be the same as those described above for the wetting agent. In this case, the polyhydric alcohol and the like may be added as an agent other than the wetting agent.

Examples of preferred alginic acid derivatives include alkali metal salts (for example, sodium salt and potassium salt) of alginic acid, organic salts (for example, triethanolamine salt) of alginic acid, and ammonium salt of alginic acid. The amount of the alginic acid derivative added to the ink composition is preferably about 0.01 to 1% by weight, more preferably about 0.05 to 0.5% by weight.

If necessary, the ink composition according to the present invention may contain at least one of other additives such as preservatives, fungicides, and phosphoric acid antioxidants.

The ink composition according to the present invention may be prepared by a conventional method, for example, by dispersing and mixing the above individual ingredients by a suitable method. A preferred method is as follows. The pigment, the polymeric dispersant, and the ion-exchanged water are first mixed together in a suitable dispergator (for example, a ball mill, a sand mill, an attritor, a roll mill, an agitator mill, a Henschel mixer, a colloid mill, an ultrasonic homogenizer, a jet mill, or an angmill) to prepare a homogeneous pigment dispersion. Next, the alkali-soluble copolymer (for example, as an aqueous solution), the wax, the ion-exchanged water, and optionally the water-soluble organic solvent, the preservative, the fungicide and the like are added thereto and the mixture is thoroughly stirred at room temperature to prepare an ink solvent. The above pigment dispersion is gradually added dropwise to the ink solvent while stirring with a suitable dispergator, and the mixture is thoroughly stirred. After thorough stirring, coarse particles and foreign materials causative of clogging are removed by filtration to prepare a desired ink composition.

Recording Method and Recording Medium

The ink composition according to the present invention is used in recording methods using ink compositions. Recording methods using ink compositions include, for example, ink jet recording and recording using writing utensils, such as pens. Further, the ink composition is suitable for use as water-based gravure inks, water-based flexo inks, or particularly water-based inks for ink jet recording. Furthermore, the ink composition according to the present invention is usable as water-based paints. The ink composition according to the present invention is particularly preferably used for ink jet recording.

Therefore, according to another aspect of the present invention, there is provided a recording method, especially an ink jet recording method, using the ink composition according to the present invention.

According to the recording method in a preferred embodiment of the present invention, the recording medium used is preferably such that at least one member selected from the group consisting of an alkali-soluble copolymer, a pigment, wax, a viscosity modifier, and a wetting agent substantially stays on the surface of the recording medium and liquid ingredients other than the at least one member, for example, water contained in the ink composition and an organic solvent optionally contained in the ink composition are absorbed in the recording medium. Such recording media include, for example, those which have been designed so that the average pore diameter of the surface is smaller than the average particle diameter of the pigment, or those which have been designed so that the average pore diameter of the ink-receptive layer is smaller than the average particle diameter of the pigment.

An example of the above recording media is a recording medium comprising a porous pigment-containing ink-receptive layer provided on a substrate. The ink-receptive layer may be the uppermost layer of the recording medium, or an intermediate layer on which, for example, a gloss layer is provided. Ink-receptive layers are known to be divided into the so-called absorption type (also known as void type), in which a porous pigment and a binder resin are contained, and the so-called swelling type in which casein, modified polyvinyl alcohol (PVA), gelatin, modified urethane or other resin is further contained in the ink-receptive layer. Both the above types are usable in the present invention.

Porous pigments, which may be contained in the absorption-type ink-receptive layer, include, for example, silica pigments prepared, for example, a precipitation method, a gel type, or a vapor phase method, alumina hydrates such as pseudo-boehmite, silica/alumina hybrid sol, smectite clay, calcium carbonate, calcium sulfate, barium sulfate, titanium dioxide, kaolin, white clay, talc, magnesium silicate, or calcium silicate. They may be used alone or in a combination of two or more.

The binder resin contained in the absorption-type ink-receptive layer is not particularly limited so far as the binder resin is a compound which has a binding capability and can enhance the strength of the ink-receptive layer, and examples thereof include polyvinyl alcohol, silanol modified polyvinyl alcohol, vinyl acetate, starch, cellulose derivatives such as carboxymethyl cellulose, casein, gelatin, conjugated diene copolymer latexes such as styrene-butadiene copolymer latexes, vinyl copolymer latexes such as ethylene-vinyl acetate copolymer latexes, and acryl copolymer latexes such as acrylic polymer and methacrylic polymer latexes.

If necessary, the ink-receptive layer may contain various additives such as fixing agents, brightening agents, water-proofing agents, fungicides, preservatives, dispersants, surfactants, thickening agents, pH adjustors, antifoaming agents and/or water-retaining agents.

Substrates on which the ink-receptive layer is provided include papers (including sized papers); resin coated papers such as papers coated with polyethylene, polypropylene, polyesters or the like; baryta paper; thermoplastic resin films such as polyethylene terephthalate, polyethylene, or polypropylene films; synthetic papers; and sheets formed of synthetic fibers.

In a particularly preferred embodiment, the recording medium comprises a substrate and an ink-receptive layer provided as the uppermost layer on the substrate. The substrate and the ink-receptive layer preferably have, for example, the following physical properties.

The substrate is preferably paper (containing wood pulp), and the basis weight thereof is preferably 100 to 350 $g/m^2$, more preferably 180 to 260 $g/m^2$. The thickness of the substrate is preferably 100 to 400 μm, more preferably 180 to 260 μm. In the ink-receptive layer, preferably, 50 to 60% by weight, in terms of solid content based on the weight of the whole ink-receptive layer, of wet-process silica gel as the porous pigment and 30 to 40% by weight, in terms of solid content based on the weight of the whole ink-receptive layer, of polyvinyl alcohol as the binder resin are contained from the viewpoints of ink absorption, fastness of prints and the like. The coverage of the ink-receptive layer is preferably 5 to 50 $g/m^2$ on a solid basis from the viewpoint of ink absorption. The thickness of the ink-receptive layer per se is preferably 10 to 40 μm, more preferably 20 to 30 μm.

Recording media on which the ink composition of the present invention is printed are preferably such that the average pore diameter of the surface of the recording media (particularly the ink-receptive layer) is not more than 50 nm, more preferably not more than 30 nm. When the average pore diameter exceeds 300 nm, the pigment is penetrated into the ink-receptive layer and, consequently, the color development is often deteriorated.

EXAMPLES

The following Examples further illustrate the present invention but are not intended to limit it. In Examples, "%" and "parts" are by weight unless otherwise specified. The acid value of the alkali-soluble copolymers prepared in the following preparation examples was measured according to JIS (Japanese Industrial Standards) K 0070.

Example A

Alkali-Soluble Copolymer A

Ethyl methacrylate (60 parts), 36 parts of methyl methacrylate, 4 parts of methacrylic acid, 3 parts of octyl thioglycolate as a molecular weight modifier, 1 part of polyvinyl alcohol, and 280 parts of ion-exchanged water were mixed with stirring to prepare a dispersion of a monomer mixture.

Ion-exchanged water (130 parts) and 2 parts of potassium persulfate were charged into another reactor with a stirrer. The temperature of the mixture was raised to 80° C., and the dispersion of the monomer mixture prepared above was continuously added thereto over a period of 4 hr for polymerization. After the completion of the continuous addition, a post reaction was allowed to proceed at 80° C. for 30 min. The polymerization conversion was not less than 99%.

Next, a 10% aqueous sodium hydroxide solution in an amount equimolar, in terms of sodium hydroxide, with the charged methacrylic acid was added to the reactor. The mixture was further heat treated at 80° C. for one hr. A proper amount of ion-exchanged water was then added to the reactor to prepare an alkali-soluble copolymer A having a solid content of 15%. The alkali-soluble copolymer A had an acid value of 30.

Preparation of Inks

A pigment, a dispersant, and water were mixed together, and the mixture, together with glass beads [diameter: 1.7 mm, amount: 1.5 times (by weight) larger than the mixture], was dispersed for 2 hr in a sand mill (manufactured by Yasukawa Seisakusho). Thereafter, the glass beads were removed to prepare a pigment dispersion.

Separately, a solvent and wax or a resin emulsion, which are ink ingredients other than the pigment and the dispersant, are mixed together to prepare an ink solvent. The ink solvent was gradually added dropwise to a mixture of the pigment dispersion and the alkali-soluble copolymer A with stirring, and the mixture was stirred at room temperature for 20 min, followed by filtration through a 5-em membrane filter. In this way, inks of Examples A1 to A6 were prepared.

Example A1

Black Ink

| | |
|---|---|
| Carbon Black MA 7 (manufactured by Mitsubishi Chemical Corporation) | 3 wt % |
| Styrene-acrylic acid copolymer (dispersant) | 1 wt % |
| Alkali-soluble copolymer A | 2 wt % |
| AQUACER 498 (m.p. 58° C., solid content 50%, manufactured by Bik-Chemie Japan K.K.) | 0.4 wt % |
| 1,2-Hexanediol | 5 wt % |
| BYK 348 (polysiloxane surfactant, manufactured by Bik-Chemie Japan K.K.) | 0.3 wt % |
| Glycerin | 10 wt % |
| Ion-exchanged water | Balance |

Example A2

Black Ink

| | |
|---|---|
| Carbon Black MA 7 (manufactured by Mitsubishi Chemical Corporation) | 3 wt % |
| Styrene-acrylic acid copolymer (dispersant) | 1 wt % |
| Alkali-soluble copolymer A | 2 wt % |
| AQUACER 535 (m.p. 95° C., solid content 30%, manufactured by Bik-Chemie Japan K.K.) | 0.8 wt % |
| 1,2-Hexanediol | 5 wt % |
| OlfineE-1010 (acetylene glycol surfactant) | 1 wt % |
| Glycerin | 10 wt % |
| Ion-exchanged water | Balance |

Example A3

Black Ink

| | |
|---|---|
| Carbon Black MA 7 (manufactured by Mitsubishi Chemical Corporation) | 3 wt % |
| Styrene-acrylic acid copolymer (dispersant) | 1 wt % |
| Alkali-soluble copolymer A | 2 wt % |
| CERAFLOUR 990 (m.p. 105° C., manufactured by Bik-Chemie Japan K.K.) | 0.2 wt % |
| Triethylene glycol monobutyl ether | 10 wt % |
| OlfineE-1010 (acetylene glycol surfactant) | 1 wt % |
| Glycerin | 10 wt % |
| Ion-exchanged water | Balance |

Example A4

Color Ink Set (1) Cyan ink

| | |
|---|---|
| C.I. Pigment Blue 15:3 | 2 wt % |
| Styrene-acrylic acid copolymer (dispersant) | 1 wt % |
| Alkali-soluble copolymer A | 2 wt % |
| AQUACER 498 | 0.4 wt % |
| 1,2-Hexanediol | 5 wt % |
| BYK 348 (polysiloxane surfactant, manufactured by Bik-Chemie Japan K.K.) | 0.3 wt % |
| Diethylene glycol | 10 wt % |
| Ion-exchanged water | Balance |

(2) Magenta ink

| | |
|---|---|
| C.I. Pigment Red 122 | 3 wt % |
| Styrene-acrylic acid copolymer (dispersant) | 1 wt % |
| Alkali-soluble copolymer A | 2 wt % |
| AQUACER 498 | 0.4 wt % |
| 1,2-Hexanediol | 5 wt % |
| OlfineE-1010 (acetylene glycol surfactant) | 1 wt % |
| Glycerin | 5 wt % |
| Diethylene glycol | 5 wt % |
| Ion-exchanged water | Balance |

-continued (3) Yellow ink

| | |
|---|---|
| C.I. Pigment Yellow 74 | 3.5 wt % |
| Styrene-acrylic acid copolymer (dispersant) | 1 wt % |
| Alkali-soluble copolymer A | 2 wt % |
| AQUACER 498 | 0.4 wt % |
| Triethylene glycol monobuthyl ether | 10 wt % |
| OlfineE-1010 | 1 wt % |
| Glycerin | 8 wt % |
| Ion-exchanged water | Balance |

Example A5

Black Ink

An ink was prepared in the same manner as in Example A1, except that, in the ink composition of Example A1, a polypropylene emulsion (m.p. 110° C.) was used instead of AQUACER 535.

Example A6

Black Ink

An ink was prepared in the same manner as in Example A1, except that, in the ink composition of Example A1, a polypropylene emulsion (m.p. 95° C.) was used instead of AQUACER 535.

Print Evaluation Test A

Individual ink compositions prepared in Example A were used for print evaluation. For print evaluation, printing was carried out on PM photographic paper [ink jet specialty paper, manufactured by Seiko Epson Corp.] by means of an ink jet printer [PM-920C, manufactured by Seiko Epson Corp.].

Evaluation 1: Rubbing/Abrasion Resistance Test 1 (Evaluation by Rubbing with a Finger)

When 3 min elapsed from printing, the printed surface of the recording medium was rubbed with a finger. The print was then visually inspected for separation of the colorant to judge the rubbing/abrasion resistance of the print. The evaluation criteria are as follows.

Evaluation Criteria

A: Colorant not separated at all.

B: Colorant slightly separated (separation: less than 20% of the whole colorant).

C: Colorant separated (separation: 20 to less than 80% of the whole colorant).

D: Colorant substantially entirely separated (separation: not less than 80% of the whole colorant).

Evaluation 2: Rubbing/Abrasion Resistance Test 2 (Evaluation According to JIS K 5701)

When 48 hr elapsed from printing, the rubbing/abrasion resistance of the print was evaluated with a Sutherland Rub Tester according to JIS K 5701. The evaluation criteria are as follows.

Evaluation Criteria

A: Colorant not separated at all.

B: Colorant slightly separated (separation: less than 20% of the whole colorant).

C: Colorant separated (separation: 20 to less than 80% of the whole colorant).

D: Colorant substantially entirely separated (separation: not less than 80% of the whole colorant).

Evaluation 3: Scratch Resistance

When 3 min elapsed from printing, a claw was pressed against and moved on the surface of the printed medium. The print was then visually inspected for the formation of a scratch on the surface of the recorded medium to judge the scratch resistance of the print. The evaluation criteria are as follows.

Evaluation Criteria

AA:

A: Scratch not formed on the surface of the recorded medium.

B: Scratch slightly formed on the surface of the recorded medium.

C: Scratch formed on the surface of the recorded medium, but colorant not separated.

D: Scratch formed on the surface of the recorded medium, and, further, colorant separated.

The results of evaluation of the above items are shown in Table A1 below.

TABLE A1

| Example A | Evaluation 1 | Evaluation 2 | Evaluation 3 |
|---|---|---|---|
| 1 | A | A | A |
| 2 | A | A | A |
| 3 | A | A | A |
| 4 Cyan | A | A | A |
| 4 Magenta | A | A | A |
| 4 Yellow | A | A | A |
| 5 | A | A | AA |
| 6 | A | A | AA |

Example B

Preparation of Alkali-Soluble Copolymer B

Ethyl methacrylate (60 parts), 36 parts of methyl methacrylate, 4 parts of methacrylic acid, 3 parts of octyl thioglycolate as a molecular weight modifier, 1 part of polyvinyl alcohol, and 280 parts of ion-exchanged water were mixed with stirring to prepare a dispersion of a monomer mixture.

Ion-exchanged water (130 parts) and 2 parts of potassium persulfate were charged into another reactor with a stirrer. The temperature of the mixture was raised to 80° C., and the dispersion of the monomer mixture prepared above was continuously added thereto over a period of 4 hr for polymerization. After the completion of the continuous addition, a post reaction was allowed to proceed at 80° C. for 30 min. The polymerization conversion was not less than 99%.

Next, a 10% aqueous sodium hydroxide solution in an amount equimolar, in terms of sodium hydroxide, with the charged methacrylic acid was added to the reactor. The mixture was further heat treated at 80° C. for one hr. A proper amount of ion-exchanged water was then added to the reactor to prepare an alkali-soluble copolymer B having a solid content of 15%. The alkali-soluble copolymer B had an acid value of 30.

Preparation of Inks

A pigment, a dispersant, and water were mixed together, and the mixture, together with glass beads [diameter: 1.7 mm, amount: 1.5 times (by weight) larger than the mixture], was dispersed for 2 hr in a sand mill (manufactured by Yasukawa Seisakusho). Thereafter, the glass beads were removed to prepare a pigment dispersion.

Separately, a solvent and a viscosity modifier, which are ink ingredients other than the pigment and the dispersant, are mixed together to prepare an ink solvent. The ink solvent was gradually added dropwise to a mixture of the pigment dispersion and the alkali-soluble copolymer B prepared above with stirring, and the mixture was stirred at room temperature for 20 min, followed by filtration through a 5-μm membrane filter to prepare an ink.

Example B1

(1) Black ink

| Carbon Black MA 7 (manufactured by Mitsubishi Chemical Corporation) | 3 wt % |
|---|---|
| Styrene-acrylic acid copolymer (dispersant) | 1 wt % |
| Alkali-soluble copolymer B | 2 wt % |
| RHEOLATE 350 (viscosity modifier) (active ingredients 50%, manufactured by Rheox International Inc.) | 0.2 wt % |
| Glycerin | 10 wt % |
| Ion-exchanged water | Balance |

(2) Cyan ink

| C.I. Pigment Blue 15:3 | 2 wt % |
|---|---|
| Styrene-acrylic acid copolymer (dispersant) | 1 wt % |
| Alkali-soluble copolymer B | 2 wt % |
| RHEOLATE 350 (viscosity modifier) | 0.2 wt % |
| Triethylene glycol monobutyl ether | 10 wt % |
| Diethylene glycol | 10 wt % |
| Ion-exchanged water | Balance |

(3) Magenta ink

| C.I. Pigment Red 122 | 3 wt % |
|---|---|
| Styrene-acrylic acid copolymer (dispersant) | 1 wt % |
| Alkali-soluble copolymer B | 2 wt % |
| RHEOLATE 350 (viscosity modifier) | 0.2 wt % |
| Triethylene glycol monobutyl ether | 10 wt % |
| Glycerin | 5 wt % |
| Diethylene glycol | 5 wt % |
| Ion-exchanged water | Balance |

(4) Yellow ink

| C.I. Pigment Yellow 74 | 3.5 wt % |
|---|---|
| Styrene-acrylic acid copolymer (dispersant) | 1 wt % |
| Alkali-soluble copolymer B | 2 wt % |
| RHEOLATE 350 (viscosity modifier) | 0.2 wt % |
| Triethylene glycol monobutyl ether | 10 wt % |
| Glycerin | 8 wt % |
| Ion-exchanged water | Balance |

Print Evaluation Test B

Individual inks prepared in Example B1 were used for print evaluation. For print evaluation, printing was carried out on PM photographic paper [ink jet specialty paper, manufactured by Seiko Epson Corp.] by means of an ink jet printer [PM-900C, manufactured by Seiko Epson Corp.].

Evaluation 1: Gloss

For the full-color image after printing, the gloss of a pint part with a printing duty of 30% was measured with a gloss meter (PG-1 M, manufactured by Nippon Denshoku Co., Ltd.). The regular reflection at 20°, 60°, and 85° was measured to determine the glosses at respective angles. The results of evaluation are shown in Table B1 below.

TABLE B1

| | Evaluation 1 | | |
|---|---|---|---|
| Example B | 20° | 60° | 85° |
| 1 | 100 | 115 | 110 |

Example C

Preparation of Alkali-Soluble Copolymer Resin (1) Alkali-soluble copolymer resin C1

Ethyl acrylate (55 parts), 37 parts of methyl acrylate, 6 parts of methacrylic acid, 3 parts of octyl thioglycolate as a molecular weight modifier, 2.5 parts of polyvinyl alcohol, and 280 parts of ion-exchanged water were mixed with stirring to prepare a dispersion of a monomer mixture.

Next, 130 parts of ion-exchanged water and 2 parts of potassium persulfate were charged into another reactor with a stirrer. The temperature of the mixture was raised to 80° C., and the dispersion of the monomer mixture prepared above was continuously added thereto over a period of 4 hr for polymerization. After the completion of the continuous addition, a reaction was allowed to proceed at 80° C. for 30 min.

Next, a 10% aqueous sodium hydroxide solution in an amount equimolar, in terms of sodium hydroxide, with the charged methacrylic acid was added to the reactor. The mixture was further heat treated at 80° C. for one hr. A proper amount of ion-exchanged water was then added to the reactor to prepare an alkali-soluble copolymer C1 having a solid content of 15%.

This alkali-soluble copolymer C1 had an acid value of 40, a weight average molecular weight of 11,000, a glass transition temperature of 25° C., a pH value of 9.2, a particle diameter of not more than 50 nm, and a turbidity of not more than 30 g/liter.

The "turbidity" is a value as measured with WATER-ANALIZER 2000, manufactured by Nippon Denshoku Co., Ltd. at a cell width of 10 mm for a sample having a resin solid content of 15%.

(2) Alkali-Soluble Copolymer C2

An alkali-soluble copolymer C2 was prepared in the same manner as in the preparation of the alkali-soluble copolymer C1, except that the amount of octyl thioglycolate added was increased. This alkali-soluble copolymer C2 had an acid value of 40, a weight average molecular weight of 8,000, a glass transition temperature of 25° C., a pH value of 9.3, a particle diameter of not more than 50 nm, and a turbidity of not more than 30 g/liter.

(3) Alkali-Soluble Copolymer C3

An alkali-soluble copolymer C3 was prepared in the same manner as in the preparation of the alkali-soluble copolymer C1, except that the amount of octyl thioglycolate added was decreased. This alkali-soluble copolymer C3 had an acid value of 40, a weight average molecular weight of 20,000, a glass transition temperature of 25° C., a pH value of 9.3, a particle diameter of not more than 50 nm, and a turbidity of not more than 30 g/liter.

(4) Alkali-Soluble Copolymer C4

An alkali-soluble copolymer C4 was prepared in the same manner as in the preparation of the alkali-soluble copolymer C1, except that the monomer composition was regulated. This alkali-soluble copolymer C4 had an acid value of 5, a weight average molecular weight of 8,000, a glass transition temperature of 25° C., a pH value of 8, a particle diameter of not more than 50 nm, and a turbidity of not more than 30 g/liter.

Preparation of Colorants (1) Colorant C1

| C.I. Pigment Red 122 | 10 wt % |
|---|---|
| Styrene-acrylic acid copolymer (dispersant resin) | 3 wt % |

The above C.I. Pigment Red 122 was mixed with the dispersant resin. The concentration of the dispersed pigment was adjusted to 10% by the addition of pure water to prepare a mixed liquid. The mixed liquid, together with glass beads (diameter: 1.7 mm, amount: 1.5 times (by weight) larger than the mixture), was dispersed for 2 hr in a sand mill (manufactured by Yasukawa Seisakusho). After the dispersion, the glass beads were removed, and the following ingredients were then added to the pigment dispersion. After stirring at room temperature for 20 min, the mixture was filtered through an 8-μm membrane filter to prepare a colorant C1.

(2) Colorant C2

A colorant C2 was prepared in the same manner as described above for the preparation of the colorant C1, except that C.I. Pigment Yellow 74 was used as the pigment instead of C.I. Pigment Red 122.

(3) Colorant C3

A colorant C3 was prepared in the same manner as described above for the preparation of the colorant C1, except that Pigment Blue 15:3 was used as the pigment instead of C.I. Pigment Red 122.

(4) Colorant C4

A colorant C4 was prepared in the same manner as described above for the preparation of the colorant C1, except that C.I. Pigment Red 178 was used as the pigment instead of C.I. Pigment Red 122.

(5) Colorant C5

A colorant C5 was prepared in the same manner as described above for the preparation of the colorant C1, except that C.I. Pigment Violet 23 was used as the pigment instead of C.I. Pigment Red 122.

(6) Colorant C6

A colorant C6 was prepared in the same manner as described above for the preparation of the colorant C1, except that carbon black was used as the pigment instead of C.I. Pigment Red 122.

Example C1

The following ingredients were mixed together, followed by filtration to prepare inks for constituting an ink set.

(1) Magenta ink

| | |
|---|---|
| Colorant C1 | 15 wt % |
| Alkali-soluble copolymer C1 (solid content 0.9 wt %) | 6 wt % |
| Glycerin | 15 wt % |
| Triethylene glycol monobutyl ether | 8 wt % |
| Surfynol 465 (acetylene glycol surfactant) | 0.9 wt % |
| Triethanolamine | 0.7 wt % |
| Ethylene glycol | 5 wt % |
| 2-Pyrrolidone | 3 wt % |
| EDTA | 0.05 wt % |
| Ultrapure water | Balance |

(2) Yellow ink

| | |
|---|---|
| Colorant 2 | 30 wt % |
| Alkali-soluble copolymer C1 (solid content 0.9 wt %) | 6 wt % |
| Glycerin | 12 wt % |
| 1,2-Hexanediol | 5 wt % |
| Surfynol 465 | 1 wt % |
| Triethanolamine | 0.7 wt % |
| Ethylene glycol | 8 wt % |
| 2-Pyrrolidone | 4 wt % |
| EDTA | 0.05 wt % |
| Ultrapure water | Balance |

(3) Cyan ink

| | |
|---|---|
| Colorant C3 | 15 wt % |
| Alkali-soluble copolymer C1 (solid content 0.9 wt %) | 6 wt % |
| Glycerin | 16 wt % |
| Triethylene glycol monobutyl ether | 5 wt % |
| BYK 348 (polysiloxane surfactant, manufactured by Bik-Chemie Japan K.K.) | 0.3 wt % |
| Triethanolamine | 0.7 wt % |
| Ethylene glycol | 8 wt % |
| HS-500 (sugar alcohol, manufactured by HAYASHIBARA SHOJI, INC Group Corporation.) | 5 wt % |
| 2-Pyrrolidone | 4 wt % |
| EDTA | 0.05 wt % |
| Ultrapure water | Balance |

(4) Red ink

| | |
|---|---|
| Colorant C4 | 25 wt % |
| Alkali-soluble copolymer C1 (solid content 0.9 wt %) | 6 wt % |
| Glycerin | 12 wt % |
| Triethylene glycol monobutyl ether | 5 wt % |
| 1,2-Hexanediol | 5 wt % |
| Surfynol 465 | 1 wt % |
| Triethanolamine | 0.7 wt % |
| Ethylene glycol | 8 wt % |
| Sorbit | 5 wt % |
| 2-Pyrrolidone | 4 wt % |
| EDTA | 0.05 wt % |
| Ultrapure water | Balance |

(5) Violet ink

| | |
|---|---|
| Colorant C5 | 20 wt % |
| Alkali-soluble copolymer C1 (solid content 0.9 wt %) | 6 wt % |
| Glycerin | 16 wt % |
| 1,2-Hexanediol | 5 wt % |
| Surfynol 465 | 1 wt % |
| BYK 348 | 0.3 wt % |
| Triethanolamine | 0.7 wt % |
| Ethylene glycol | 8 wt % |
| Panitol | 5 wt % |
| EDTA | 0.05 wt % |
| Ultrapure water | Balance |

(6) Black ink

| | |
|---|---|
| Colorant C6 | 15 wt % |
| Alkali-soluble copolymer C1 (solid content 0.9 wt %) | 6 wt % |
| Glycerin | 10 wt % |
| Diethylene glycol | 5 wt % |
| Diethylene glycol monobutyl ether | 5 wt % |
| 1,2-Hexanediol | 5 wt % |
| Olfine STG (acetylene glycol surfactant) | 1 wt % |
| BYK 348 | 0.3 wt % |
| Triethanolamine | 0.7 wt % |
| Ethylene glycol | 2 wt % |
| EDTA | 0.05 wt % |
| Ultrapure water | Balance |

Example C2

An ink set was prepared in the same manner as in Example C1, except that the alkali-soluble copolymer C2 was used instead of the alkali-soluble copolymer C1.

Example C3

An ink set was prepared in the same manner as in Example C1, except that the alkali-soluble copolymer C3 was used instead of the alkali-soluble copolymer C1.

Example C4

An ink set was prepared in the same manner as in Example C1, except that the alkali-soluble copolymer C4 was used instead of the alkali-soluble copolymer C1.

Print Evaluation Test C

Evaluation 1: Fixation Test

Ink sets of Examples C1 to C4 were loaded into an ink jet recorder EM-900C (manufactured by Seiko Epson Corp.), and individual ink compositions were printed with an identical printing duty on PM photographic paper (manufactured by Seiko Epson Corp.). A mending tape manufactured by Sumitomo 3M Ltd. was applied to a printed part in the print immediately after the start of printing and a printed part at the end of printing (3 min after the start of printing) to inspect the prints for the separation of the colorant. The evaluation was made according to the following criteria.

Evaluation Criteria

A: No separation of colorant observed from a point of time immediately after the start of printing.
B: No separation of colorant observed from a point of 3 min after the start of printing.
C: Separation of colorant observed even from a point of 3 min after the start of printing.

Evaluation 2: Storage Stability

The ink compositions constituting the ink sets of Examples C1 to C4 were allowed to stand under an environment of 70° C. for 7 days, and the viscosity was measured. The results were evaluated according to the following criteria.

Evaluation Criteria

A: A change in viscosity of not more than 0.3 cps observed.
B: A change in viscosity of not more than 0.5 cps observed.
C: A change in viscosity of not more than 0.8 cps observed.

Evaluation 3: Gloss

The ink compositions constituting the ink sets of Examples C1 to C4 were loaded into an ink jet recorder EM-900C, and individual ink compositions were printed with an identical printing duty on PM photographic paper. The samples were visually inspected and were evaluated according to the following criteria. Illumination used for evaluation was a fluorescent lamp.

Evaluation Criteria

A: The shape of illumination could be recognized.
B: The shape of illumination could not be recognized.

The results of evaluation for each item are shown in Table C1 below.

TABLE C1

| Example | Evaluation 1 | Evaluation 2 | Evaluation 3 |
|---|---|---|---|
| C1 | | | |
| Y | A | A | A |
| M | A | A | A |
| C | A | A | A |
| R | A | A | A |
| V | A | A | A |
| Bk | A | A | A |
| C2 | | | |
| Y | A | A | A |
| M | A | A | A |
| C | A | A | A |
| R | A | A | A |
| V | A | A | A |
| Bk | A | A | A |
| C3 | | | |
| Y | A | A | A |
| M | A | A | A |
| C | A | A | A |
| R | A | A | A |
| V | A | A | A |
| Bk | A | A | A |
| C4 | | | |
| Y | A | A | A |
| M | A | A | A |
| C | A | A | A |
| R | A | A | A |
| V | A | A | A |
| Bk | A | A | A |

In Table C1, Y represents yellow ink, M magenta ink, C cyan ink, R red ink, V violet ink, and Bk black ink.

The invention claimed is:

1. An ink composition comprising an admixture of: an alkali-soluble copolymer; water; a colorant; and at least one member selected from the group consisting of wax, a viscosity modifier, and a wetting agent,
said alkali-soluble copolymer being a copolymer, with an acid value of not more than 40, which is produced, prior to its admixture with the colorant and the at least one member, by polymerizing an ethylenically unsaturated carboxylic acid monomer and other monomer copolymerizable with the ethylenically unsaturated carboxylic acid monomer in the presence of an alcoholic hydroxyl-containing water-soluble polymer compound or a copolymerizable surfactant and has been adjusted to a pH value, at which the copolymer is soluble in water, by the addition of an inorganic base.

2. The ink composition according to claim 1, wherein said wax is a polyalkylene wax.

3. The ink composition according to claim 2, wherein said polyalkylene wax is a polyethylene wax.

4. The ink composition according to claim 1, wherein said wax is a resin emulsion which is a polyalkylene emulsion.

5. The ink composition according to claim 4, wherein said polyalkylene emulsion is a polyethylene emulsion.

6. The ink composition according to claim 1, wherein said viscosity modifier is a polymer produced by a polymerization reaction of (a) methacrylic acid, (b) a methacrylic ester, and (c) a vinyl ester of a saturated aliphatic carboxylic acid.

7. The ink composition according to claim 1, wherein said wetting agent is a polyhydric alcohol, sugar, or a tertiary amine.

8. The ink composition according to claim 1, wherein said colorant is a pigment.

9. The ink composition according to claim 1, wherein said inorganic base is an alkali metal hydroxide or an alkaline earth metal hydroxide.

10. The ink composition according to claim 1, wherein said alcoholic hydroxyl-containing water-soluble polymer compound is a vinyl alcohol polymer.

11. The ink composition according to claim 1, wherein said ethylenically unsaturated carboxylic monomer is acrylic acid or methacrylic acid.

12. The ink composition according to claim 1, wherein said monomer copolymerizable with the ethylenically unsaturated carboxylic acid monomer is an ethylenically unsaturated carboxylic ester monomer.

13. The ink composition according to claim 1, which is used for an ink jet recording method.

14. The ink composition according to claim 1, which is produced by preparing a pigment dispersion comprising the colorant and then mixing the pigment dispersion with the colorant and the at least one member.

15. The ink composition according to claim 1, wherein the alkali-soluble copolymer is added to the ink composition in the form of an aqueous solution.

* * * * *